(12) United States Patent  
Brandel

(10) Patent No.: US 6,189,937 B1  
(45) Date of Patent: Feb. 20, 2001

(54) OUTLET FITTING FOR PIPES HAVING ROTATABLE SECURING MEANS

(75) Inventor: Janusz Brandel, Abbotsford Cove (AU)

(73) Assignee: Goyen Controls, Co., New South Wales (AU)

( * ) Notice: Under 35 U.S.C. 154(b), the term of this patent shall be extended for 0 days.

(21) Appl. No.: 09/180,872

(22) PCT Filed: May 27, 1997

(86) PCT No.: PCT/AU97/00333

§ 371 Date: Nov. 24, 1998

§ 102(e) Date: Nov. 24, 1998

(87) PCT Pub. No.: WO97/45669

PCT Pub. Date: Dec. 4, 1997

(51) Int. Cl.[7] ............................................. F16L 41/08
(52) U.S. Cl. ........................ 285/197; 285/210; 285/906
(58) Field of Search ................................. 285/208, 209, 285/210, 197, 906

(56) References Cited

U.S. PATENT DOCUMENTS

| | | | |
|---|---|---|---|
| 978,504 | * 12/1910 | Stewart | 285/209 |
| 2,945,705 | * 7/1960 | Murray | 285/210 |
| 4,023,833 | * 5/1977 | Wellard | 285/210 |
| 4,699,217 | * 10/1987 | McLennan et al. | 285/209 |
| 5,586,789 | * 12/1996 | Bently | 285/38 |

FOREIGN PATENT DOCUMENTS

| | | |
|---|---|---|
| 14773/33 | 10/1933 | (AU) . |
| 16457/56 | 9/1956 | (AU) . |
| 65144/69 | 8/1971 | (AU) . |
| 2550202 | 2/1977 | (DE) . |
| 2120340 | 11/1983 | (GB) . |

* cited by examiner

Primary Examiner—Dave W. Arola  
(74) Attorney, Agent, or Firm—Dykema Gossett, PLLC

(57) ABSTRACT

The invention relates to a fitting (70) and a securing component (90) for attaching to a hole in a pipe. The fitting (70) has at least one securing means (90) for scalably securing said fitting to a conduit (106), said fitting having a conduit engaging end (72) and a mounting surface (74) at another end, said fitting being first shaped to cooperate with an external surface (114) of said conduit, said fitting including a first aperture in said conduit engaging end which has communicable passage to a second aperture in said mounting surface, said fitting including at least one sealing surface (82) surrounding said first aperture which is adapted to make sealing contact with a resiliently compressible seal (115), said at least one securing means (90) depending from said fitting to engage an internal surface (116) of said conduit in the vicinity of a hole in said conduit, said at least one securing means (90) when securing said fitting (70) to said conduit (106) compressing said resiliently compressible seal (115) between said at least one sealing surface (82) and said external surface (114) of said conduit and sealing said fitting to said conduit. The securing means has a curved cam surface (94) to compress the resiliently compressible seal (115), and two other cam surfaces (96, 100) of differing radii of curvature to allow rotation of the securing member (90) if the bolt (104) is overtightened.

13 Claims, 3 Drawing Sheets

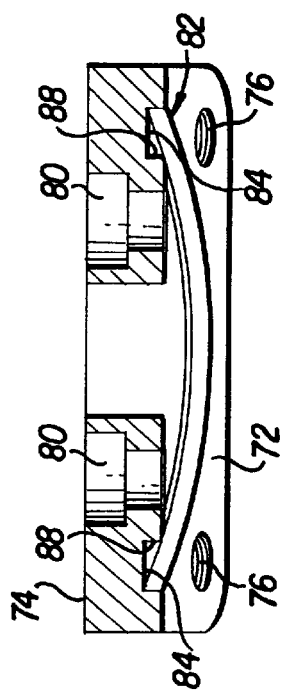
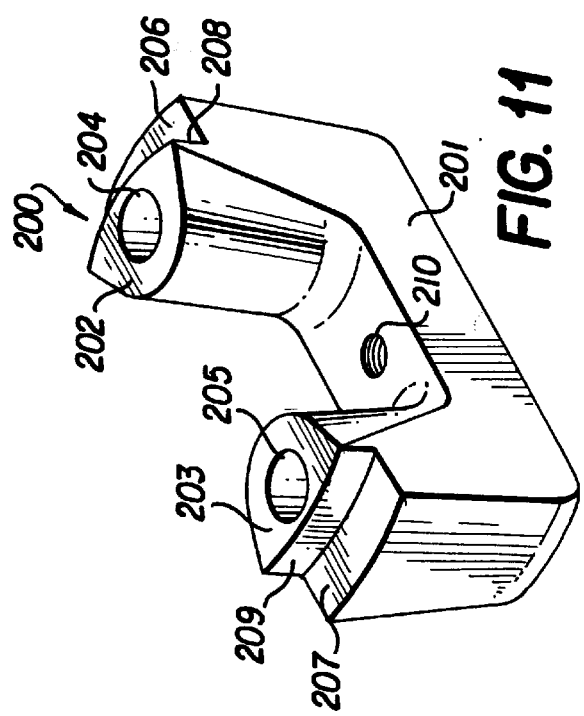
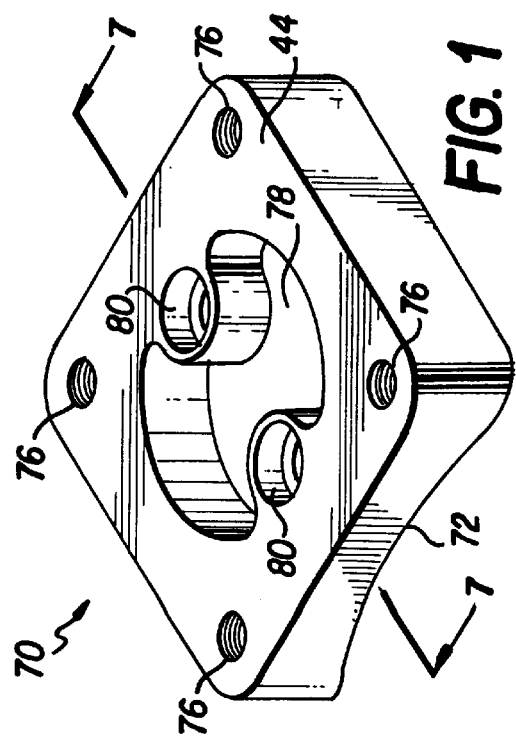
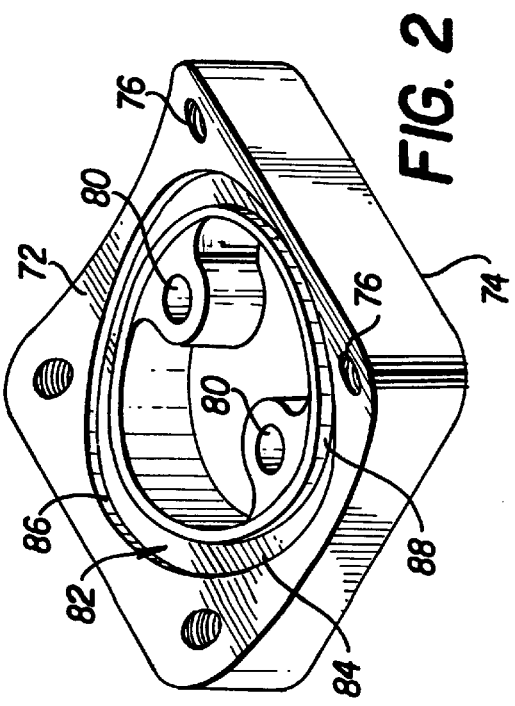

OUTLET FITTING FOR PIPES HAVING ROTATABLE SECURING MEANS

FIELD OF THE INVENTION

The present invention relates to a fitting for the attachment of a pipe or other fitting to a another pipe.

BACKGROUND OF THE INVENTION

Baghouse filtering systems use air compressed by a compressor and stored in a header tube or pipe awaiting use for cleaning of a filter bag or filter cartridge in the baghouse. The air flow to a filter is controlled by means of solenoid valves and these solenoid valves connect the header and a blow tube. Such a connection is performed by providing a seat on the header tube to attach the solenoid valve. The solenoid valves are of a right angled construction allowing relatively easy installation and removal where existing pipes and fittings are in place.

To construct a conventional outlet fitting onto a header tube requires labour intensive processes by the welding of one pipe onto another to provide the flanged seat. This first requires the drilling of a hole in the header tube approximately the same size as the pipe being connected, then welding accurately around the intersection of the two pipe surfaces. At the end of the smaller pipe (which is welded to the bigger pipe) is a flanged surface upon which can be attached the solenoid valve.

These assembly and fabrication operations are costly and expensive.

SUMMARY OF THE INVENTION

The invention further provides a fitting having at least one securing means to sealably secure said fitting to a hole in a conduit, said fitting having a conduit engaging end and a mounting surface at another end, said fitting being shaped to cooperate with an external surface of said conduit, said fitting including an aperture which communicates between said conduit engaging end and said mounting surface, said fitting including at least one sealing surface surrounding said aperture in said conduit engaging end which is adapted to make sealing contact with a resiliently compressible seal, said at least one securing means depending from said fitting to engage an internal surface of said conduit in the vicinity of said hole in said conduit, said at least one securing means when securing said fitting to said conduit thereby compressing said resiliently compressible seal between said at least one sealing surface and said external surface of said conduit and sealing, said fitting to said conduit.

Preferably a centering means is provided which keeps said first aperture in said conduit engaging end centred on said hole in said conduit.

Preferably there are two securing means.

Preferably the two securing means are diametrically opposed.

Preferably if said fitting is to engage a cylindrical surface, the centering means is provided by said two securing means being diametrically opposed and positioned so as to engage the circumference of said hole in said conduit approximately along an imaginary line parallel to the longitudinal axis of said conduit, running along said internal or external surface of said conduit, said imaginary line also being parallel to, collinear or co-incident with a diameter of said hole, whereby said hole interacts with said securing means and said conduit engaging end of said fitting to prevent circumferential movement of said fitting relative to conduit.

Preferably if said fitting is to engage a flat surface, said centering means are diametrically opposed and are located in two quadrants of said aperture in said conduit engaging end which do not include said two securing means.

The invention further provides a fitting on to which can be mounted a flanged conduit or other component, said fitting having a body which cooperates with a hole in a second conduit so that said fitting sealingly attaches to said second conduit, said fitting having an aperture through it which will have communicable passage with said hole in said conduit, said fitting being characterised by including securing means depending from formations in said aperture which, when secured, clamp the wall of said second conduit between said securing means and said fitting.

The embodiment of the above invention provides an improved assembly system to assemble the fitting into a hole on a conduit. This can be done without drilling a second hole in the diametrically opposite side of the conduit. Once the fitting is attached either a valve can be attached or alternatively another tube or flanged tube can be attached to which a valve can also be connected.

The invention also provides a securing member which interacts with a fitting to which it is to be attached so as to secure said fitting to a hole in a conduit, said securing member including a body portion having a base, an upper surface spaced from said base, a longitudinal axis which is generally perpendicular to planes including said base and said upper surface, a securing means positioned on or around said axis, a first curved side having a first radius of curvature in at least a first and second quadrant around said longitudinal axis of said body portion, and a second curved side having a second radius of curvature in a third quadrant positioned adjacent to said second quadrant, with four quadrants being divided by two planes which intersect along said longitudinal axis, said second radius of curvature preventing said body portion from rotating in only one direction when said body portion is positioned adjacent to or in contact with a surface, said body portion including a third curved surface bridging said second and third quadrants having a radius of curvature which revolves around an axis or rotation which lies substantially at a right angle to said longitudinal axis and which also lies in a plane which separates said second and third quadrants, said third curved surface being positioned above said base but below said upper surface and said radius of curvature of said third curved surface being measured in the direction from said base to said upper surface.

Preferably said securing means is a threaded bore through said body portion having a central axis which is coincident with said longitudinal axis.

Preferably said securing member is able to be, via said securing means, initially rotatably attached to a fitting so as to secure said fitting to a hole in a conduit.

Preferably said second radius of curvature greater than said first radius of curvature, or is so much greater than said first radius of curvature that it could appear as a straight line, or be a straight line.

Preferably said second side shaped or sized so that when said rotatable securing member is positioned next to a hole in a conduit and said securing member is not able to be rotated further in one direction, said second side is engaging a surface of said hole.

Preferably when said second side is engaging said surface of a hole, said plane dividing said second and third quadrants is positioned relative to said conduit so as to include a central longitudinal axis of said conduit, or be parallel to a central longitudinal axis of said conduit when viewed in a central axis of said hole in said conduit.

Preferably said third curved surface has its maximum distance measured perpendicularly from said base located in said plane separating said second and third quadrants.

Preferably said third curved surface has a radius of curvature which is substantially equivalent in size to the radius of curvature of an internal surface of said conduit.

Preferably said third curved surface is located on an end of a formation which is attached or integrally formed with said body portion.

Preferably said third curved surface is elongated in the direction of extension of said curvature.

Preferably the length of said third curved surface extends passed said body portion.

BRIEF DESCRIPTION OF THE DRAWINGS

Embodiments of the present invention will now be described, by way of example only, in which:

FIG. 1 illustrates an embodiment of the present invention in perspective view;

FIG. 2 illustrates an underneath perspective view of the apparatus of FIG. 1;

FIG. 3 illustrates a cross section through the apparatus of FIG. 1 along the line VII—VII;

FIG. 11 illustrates a perspective view of an alternative securing member for use with the fitting of FIG. 1.

DETAILED DESCRIPTION OF THE PREFERRED EMBODIMENTS

Figure 9:
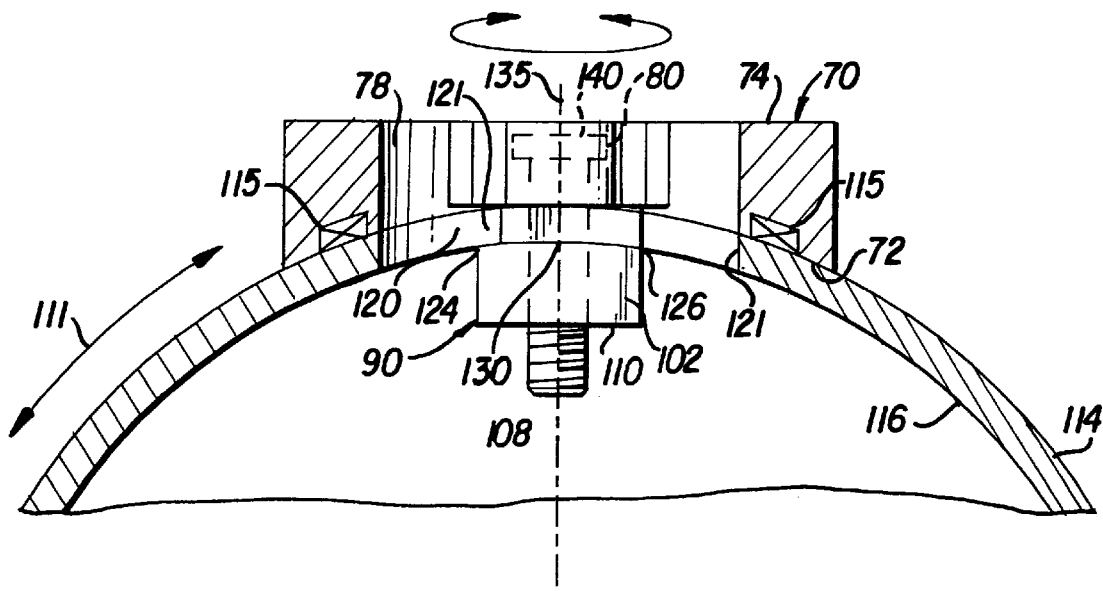
FIG. 9 illustrates in front view a cross section of the apparatus of FIGS. 4–8 when combined with the apparatus of FIGS. 1–3 when attached to a conduit.
Figure 10:
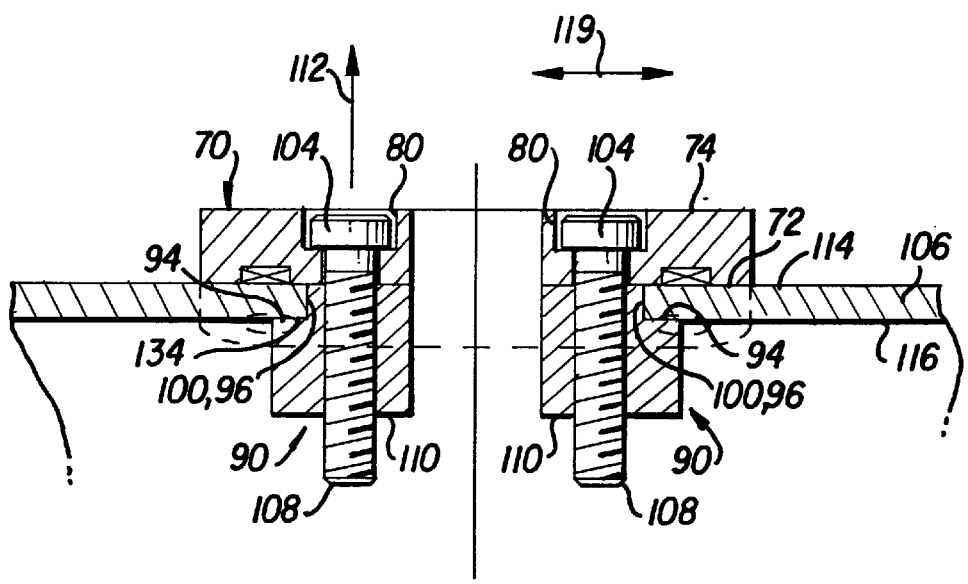
FIG. 10 illustrates in cross-section a side view of the apparatus of FIG. 9.

In the FIGS. 1 to 11 is a fitting made up of a fitting component 70 (illustrated in FIGS. 1 to 3) and a securing member 90 (illustrated in FIGS. 4 to 8) They are shown in combination in FIGS. 9 and 10. The securing means of the fitting is provided by the securing member 90 which can be generally said to operate by providing a clamping force which clamps a conduit wall in the vicinity of a hole which is to cooperate with the fitting. The securing member 90, as will be described in detail later, includes a rotating body which engages the hole of the conduit to prevent the body rotating further and which either clamps by virtue of that rotation, or achieves the clamping forces by translation substantially in a straight line.

Illustrated in FIGS. 1 and 3 is the fitting component 70 which has a generally curved under surface 72 and a flat top surface 74. The curved under surface 72 has a radius of curvature equal to the radius of curvature of the outside surface of the conduit. This allows for a close matching of the contours when there is engagement with the cylindrical surface of a conduit. The flat top surface 74 is a mounting surface to which can be attached a valve (not illustrated) or flanged pipe (not illustrated) by means of the four threaded holes 76.

An outlet aperture 78 communicates from the curved under surface 72 to the flat top surface 74, and is partially occluded by means of bolt housings 80 which extend into the aperture 78, which are diametrically opposed and are counter-bored so that one portion allows passage only of a bolt shank and the other receives a bolt head so that it is recessed relative to flat top surface 74.

On the under surface 72 is a three sided channel 82 which opens in the direction towards where a conduit to which the fitting will be attached is located. The three sided channel is made up of a first wall 84 which provides a sealing surface, a second wall 86 which provides a second sealing surface perpendicular to the first sealing surface and first wall 84 and a third sealing surface formed with a third wall 88 which is also perpendicular to first sealing surface or first wall 84 but which is spaced apart from the second sealing surface or second wall 86. In the channel 82 there can be positioned an O-ring gasket, a flat gasket or other gasket providing it is resiliently compressible. (The resiliently compressible seal is illustrated as item 115 in FIGS. 9 and 10).

Illustrated in FIGS. 4 to 8 is a cam securing member 90 which has a threaded bore 92 through a generally cylindrical body portion 98. A first cam surface 94 is generally positioned perpendicular to the body portion 98 and extends across the body portion 98. The first cam surface engages and interacts with a conduit's internal wall so as to clamp the conduit wall between it and the fitting component 70. The cam surface 94 is curved and is the end surface of a support member 105, which is formed with or attached to the generally cylindrical body 98.

A second cam surface 96 which is formed on the periphery of the generally cylindrical body 98, and has the same radius in the quadrants bounded by axes 111 and 111" & 111" and 111'. The body 98 also includes a cam surface 100 in the quadrant bounded by axes 113 and 111' which is a trailing portion from cam surface 96. Cam surface 100 is a different radius to that of the cam surface 96 and it starts at the axis 111' and terminates at edge 126. The purpose of the cam surface 100 will be described later. The two different radii of cam surface 96 and 100 blend together to form a relatively smooth surface.

Figure 4:
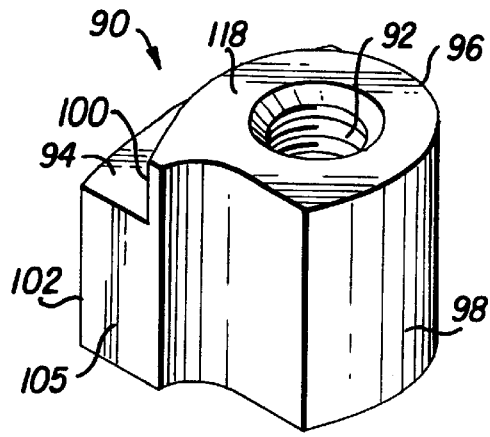
FIG. 4 illustrates a rear perspective view of a cam securing member for use with the fitting of FIG. 1.
Figure 5:
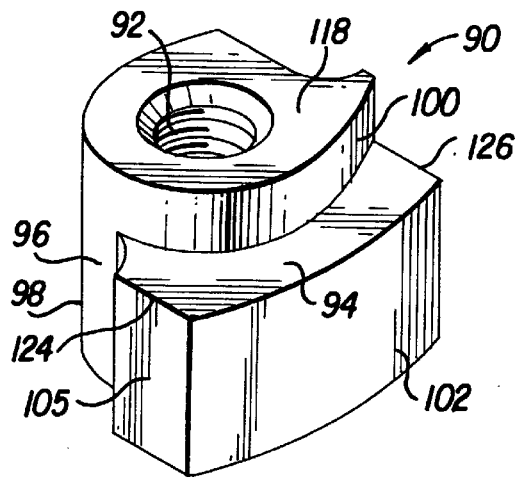
FIG. 5 illustrates a front perspective view of the apparatus of FIG. 4.
Figure 6:
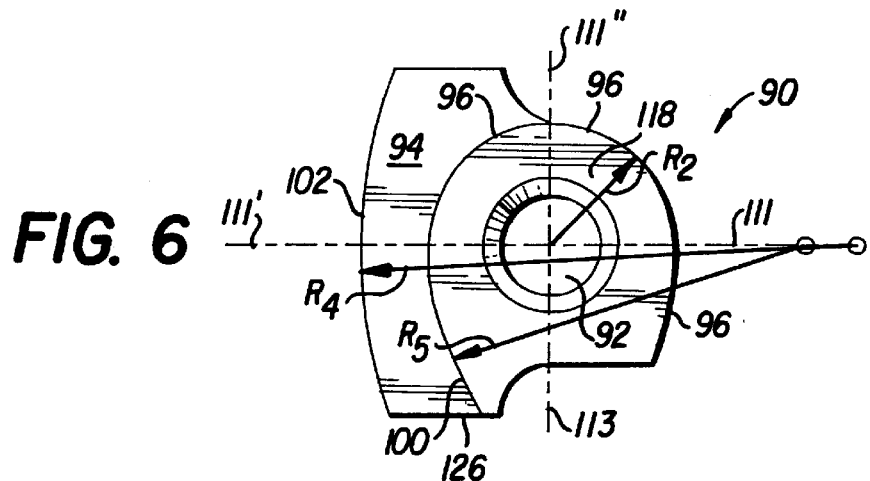
FIG. 6 illustrates a plan view of the apparatus of FIG. 4.
Figure 7:
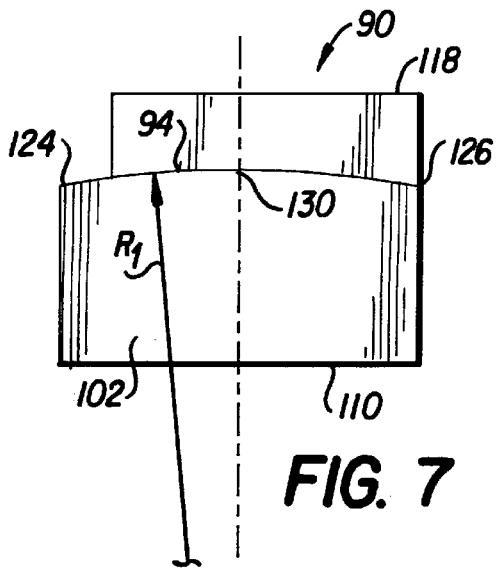
FIG. 7 illustrates a front elevation of the apparatus of FIG. 4.
Figure 8:
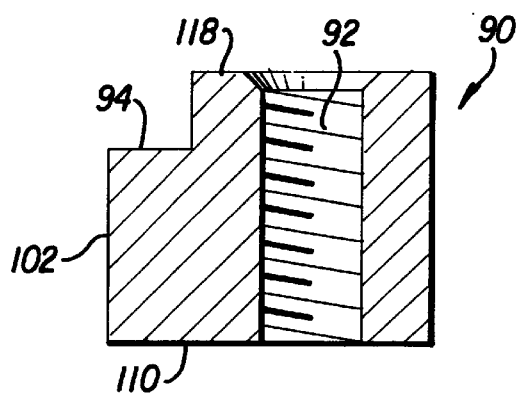
FIG. 8 illustrates a cross section through the apparatus of FIG. 4.

The radius of cam surfaces 94, 96 and 100 can be as desired, but in this embodiment the first cam surface 94 has a radius $R_1$ of 77 mm (this radius of curvature is illustrated in FIG. 7). The cam surface 96 has a radius $R_2$ of 9.7 mm (illustrated in FIG. 6) and the cam surface 100 has a radius $R_3$ of 31.5 mm. The front face 102 also has a curved surface having a radius $R_4$ of approximately 37.5 mm, but need not be so.

To support the first cam surface 94 a support member 105 is formed with or attached to the body 98 of the cam securing member 90. The support member 105 terminates with front face 102.

Two cam securing members 90 (of FIGS. 4 to 8) are attached to the fitting component 70 by means of Allen-key bolts 104 as illustrated in cross section in FIGS. 10 and 11. Depending upon the fitter's preferred practice, the fitting component 70 can be attached to the conduit 106 by at least two methods, depending upon the shape of the conduit 106. See FIGS. 9 and 10. The first is for use when the conduit 106 is cylindrical, square or rectangular. In this method the fitter pre-assembles using LOCTITE 222, or similar compound the cam securing member 90 so that the end 108 of the bolts 104 just protrude below the base 110 of the cam securing member 90. LOCTITE 222 is utilised because it prevents any unwanted rotation of the bolt 104 relative to cam securing member 90, but allows the tightening of the bolt 104, and again re-secures the bolt 104 and cam securing member 90 after tightening has occurred. The cam securing members 90 are then rotated so that the faces 102 face each other. When the fitting component 70 (including the resiliently compressible seal 115), is in place against the external surface 114 of conduit 106, the resiliently compressible seal 115 keeps the under surface 72 from engaging external surface 114 of conduit 106, because the resiliently compressible seal 115 is in it uncompressed state. When the fitting component 70 is in position over the hole 120, the securing members 90 are located in the hole 120 so that contact or near contact is made between the side wall 121 of hole 120 and the cam surface 96 somewhere in the quadrant bordered by axes 111" and 111 and or quadrant bordered by axes 113 and 111 of the securing member 90. The length of bolts 104 are sized, and the securing member 90 positioned on the bolt 104 taking into account the distance that the resiliently compressible seal 115 protrudes from the under surface 72 in its uncompressed state. Sufficient distance is left between top surface 188 and the underneath surface of the bolt housings 80.

If the orientation of securing member 90 relative to the fitting component 70 is such that first contact is made with cam surface 100, when the bolt 104 is tightened in a clockwise direction (R.H. thread), the cam securing member 90 cannot rotate because of the engagement of a portion of cam surface 100 with the side wall 121 of hold 120.

However, if the cam surface 96 is near to or engaging the side wall 121 of hole 120, then as the bolt 104 is rotated in a clockwise direction to be tightened, the cam securing member 90 will rotate with the bolt 104 until such time as the cam surface 100 makes contact with side wall 121 of hole 120. When this happens this will prevent any further rotation of cam securing member 90. Because the cam securing member 90 can no longer rotate, any further rotation of the bolt 104 in a tightening direction will move the cam surface 94 in the direction of arrow 112 into contact with the internal surface 116 of conduit 106.

The cam securing member 90 moves toward fitting component 70 until such time as the centre portion 130 of cam surface 94 engages the internal surface 116 of conduit 106. The cam surface 94 having a radius $R_1$ of 77 mm is preferably the same radius as the internal diameter of conduit 106. If desired however it may have a different radius but if so, preferably the radius of cam surface 94 is less than the internal diameter of conduit 106.

As the bolts 104 are tightened the resiliently compressible seal 115 (in this case is an O-ring) situated inside the channel 82 is gradually compressed in the channel 82. When fully compressed it pushes against each of the sealing surfaces 84, 86 and 88 and the external surface of 114 of conduit 106. The under surface 72 and the wall which includes sealing surface 88 limits the travel of the fitting component 70 towards conduit 106.

The location of the cam surface 100 on the cam securing member 90 will only be effective for a right hand thread (i.e. thread turned clockwise to tighten). If a left hand threaded bolt, and female thread in bore 92 is desired, then the body and features of the cam securing member 90 should be made as a mirror image of that illustrated in FIGS. 8 to 12.

Another method can also be used with square or rectangular conduits 106. In this other method the bolts 104 (before fitting component 70 is placed on the conduit 106) are passed through the bolt housing 80 and then have attached and secured to them the cam securing member 90. The bolts 104 are done up to a fully tightened position in which case there is no ungaged thread on the bolt 104. That is the unthreaded shank of the bolt 104 is resting near the top surface 118 of the cam securing member 90. Because the cam securing member 90 has been fully tightened with respect to the bolt 104 (together with the use of LOCTITE 222) they now act as a single, integral unit. The components will be kept secured and integrated for any rotation of the bolt 104 in tightening direction, even though no more tightening between the bolt 104 and member 90 can occur. This means that when the bolt 104 is further rotated in a tightening direction, the cam securing member 90 also rotates with it. Once the cam locking members 90 have been placed in position on the bolts 104, the front faces 102 are rotated so as to face each other. That is, the axes 111' point to each other. The fitting component 70 is then placed over the hole 120 in conduit 106 and the cam securing members 90 are passed through the hole 120 in conduit 106.

In this position the under surface 72 of fitting component 70 will be raised above the external surface 11 of conduit 106 because of resiliently compressible seal 115 having its normal cross section or uncompressed form. The radius $R_1$ of 77 mm of the first cam surface 94 ensures that the front and rear edges 124 and 126 are lower than the centre portion 130. The height from the front and rear edges 124 and 126 to centre portion 130 is the same as or marginally greater than the distance that the under surface 72 sits above the external surface 114 of the conduit when the resiliently compressible seal 115 is in its uncompressed state. This will mean that once the bolt 104 is rotated the front edge 124 of cam securing member 90 will engage the conduit 106 at the edge 134 formed at the intersection of the hole 120 with the internal surface 116. Further rotation of the bolt 104 and thus the cam securing member 90 will force the fitting component 70 towards the conduit 106 thereby compressing the compressible seal 115. The amount of compression provided by the cam securing member 90 is thus the difference in height between the centre portion 130 and the front edge 124 or rear edge 126 of the first cam surface 94.

Because the cam surface 100 of the cam securing member 90 has a radius $R_3$ which is greater than the radius $R_2$ of cam surface 96 on the cam securing member 90 cam surface 100 acts as a stop surface. When the cam securing member 90 is rotated by means of the bolt 104, the cam surface 96 rotates over and relative to the surface of hole 120 in the conduit 106 until such time as the cam surface 100 rests up against the hole 120. Because of the greater radius dimension $R_3$ of cam surface 100, the cam securing member 90 cannot rotate any further once engagement has occurred between cam surface 100 and the side wall of hole 120. Once this happens, the position of the cam securing member 90 will coincide with the centre portion 130 of first cam surface 94 being located against the internal surface 116 of conduit 106 along the diameter which coincides with centre line 135 into the page of FIG. 9, along the internal surface 116 of conduit 106 (also coincides with line VII—VII of FIG. 1).

For the first method, the length of the bolt 104 is selected so that if the wall of the conduit 106 is thicker than the distance from front or rear edges 124 and 126 to top surface 118, the cam securing member will rest at a position further down the bolt 104 by comparison to the position illustrated in FIG. 14 to accommodate the extra thickness of conduit wall 106. For the second method the length of the bolt 104, and the length of the unthreaded shank is selected to accommodate the thickness of conduit wall 106.

Any movement of the fitting component 70 relative to the conduit 106 in either direction indicated by the double arrows 119 (see FIG. 10) is prevented by the cam surfaces 100 engaging the wall of the hole 120 in the conduit 106. Any movement of the fitting component 70 relative to the conduit 106 in either direction indicated by the arrow 112 (see FIG. 10) is prevented by the cam surfaces 94 engaging the internal surface of the conduit 106. Any movement of the fitting component 70 relative to the conduit 106 in either direction indicated by the double arrows 117 (see FIG. 9) is prevented by the cam surfaces 100, because the hole 120 decreases in width (when measured parallel to the longitudinal axis of the conduit) to either side of the hole 120 upper most diameter (which is the diameter which parallel to the longitudinal axis of the conduit). Any such movement in the direction of arrows 117 would require a passage having a width equal to the diameter of the hole 120, that is a aperture having a constant width would have to have been formed, not a circular one. The fitting component 70 will not be able to rotate on the conduit 106 in the directions of arrows 117A, once securing means 90 are secured because of the interaction of the curbed under surface 72 with the curved outer surface 114 of the conduit.

Because of the constrains in three orthogonal directions between the receiving members 90 and hole 120, the under surface 72 and outer surface of the conduit, little to no movement between the fitting component 70 and conduit to which it is secured by cam securing members 90 will result. Any movement which may occur because of potential for movement resulting from tolerancing will not break the seal between the fitting component 70 and the external surface of the conduit. That is, any movement possible would be less than the distance from the line of contact of the O-ring 115 furthest from the centre of the hole 120 and the surface 121 of the hole 120.

A centering mechanism is provided by the geometry of the conduit and the geometry of the securing member 90. Because of the curvature $R_1$ of cam surface 94 engaging the curvature of a cylindrical conduit, the fitting is centred onto the conduit 106. Further, the curved geometry of surface 72 also assists in this centering function.

Illustrated in FIG. 11 is an alternative securing member 200 which has a base portion 201, from which extends a securing portion 202 and 203. The base portion 201 and securing portions 202 and 203 form a generally U shaped configuration.

The securing portion 202 and 203 have bases 204 and 205 which are threaded (not illustrated) to receive the bolts 104. Also located on the securing portion 202 and 203 are shaped surfaces 206 and 207 which engage the internal surface 116 of conduit 106, and side faces 208 and 209 which have a profile to match the curve of the side wall 121 of the hole 120.

To position this securing member 200, against the fitting component 70, a threaded hole 210 can be proved in the base 201, which can receive a threaded end of a T shaped handle/holder (the thread being of the leg of the T). The handle/holder is used to pass the securing member 200 through the aperture 78 and hole 120, and allows the operator to position the threaded holes 204 and 205 onto at the ends of bolts 104. This allows it to be attached when bolts 104 are rotated in a tightening direction. Further tightening allows the shaped surfaces 206 and 207 to contact the internal surface 116 of conduit 106 thereby compress the seal 115 and sealing securing fitting component 70 to conduit 106 as further tightening occurs.

The height of the side faces 208 and 209 can determine the amount of compression of the seal 115, as the securing member 200 moves closer to the fitting component 70. If the thickness of the wall of the conduit 106 is greater than the height of side faces 208 and 209, above the shaped surfaces 206 and 207 then the securing member 200 will not contact fitting component 70, except via the bolts 104, and will clamp the conduit 106 between the under surface 72 of fitting component 70, and shaped surfaces 206 and 207 of securing member 200.

The U shaped construction of the securing member 200, means that the base portion 201, or the connecting member between the securing portions 202 and 203, will reduce the occlusion of aperture 78. If the securing member 200 was constructed of a bar shaped member (not illustrated), with surfaces 207 and 206 milled in the ends, this may work satisfactorily, even though aperture 78 is somewhat more occluded than securing member 200.

If desired when the fitting, fitting component 70 and securing means 90 are to be used with a rectangular, square or other flat sided conduit, a centering means comprising two diametrically opposed extensions (not illustrated) which extend away from the inside edge of aperture 78 which are closely toleranced so as to fit into a hole in the conduit, can be provided. These will help to centre the fitting component 70 around the hole in the conduit so as to keep the seal 115 the same distance away from the hole all around its circumference. These two extensions can be located in two quadrants of said aperture in said conduit engaging end which do not include the two securing means 90. This will help to keep the fitting centred on the hole in the conduit, and if the securing means 90 are not finely toleranced with respect to the hole, will ensure that little movement translational movement will be available. Translational movement being of the sort which may break the seal with the external surface of the conduit. While the extensions may not in themselves prevent rotation of the fitting and fitting component 70, such rotational movement would not be of the sort to make the seal move towards the hole in the conduit.

The foregoing describes embodiments of the present invention and modifications by those skilled in the art can be made thereto without departing from the scope of the present invention.

Preferably said single securing member includes a connection means to facilitate connection of the single securing member of said securing means to a handle or holder device, to facilitate installation of said securing means to said fitting.

Preferably said at least one securing means is rotatable when it is depending from and connected to said fitting.

Preferably said at least one securing means can be rotated into contact with said internal surface of said conduit.

Preferably said at least one securing means includes a shaped surface adapted to engage said internal surface of said conduit.

Preferably said shaped surface is adapted to transmit an increasing compressive deflection to said resiliently compressible seal when said at least one securing means is continued to be rotated after said shaped surface initially engages said internal surface of said conduit.

Preferably said fitting and said conduit are secured together and sealed to airtight quality, by the rotation of said at least one securing means.

Preferably a stop means on said at least one securing means prevents it being turned beyond a pre-determined point.

Preferably said pre-determined point is when said shaped surface is in a position to engage said internal surface by movement towards said fitting.

Preferably said pre-determined point is determined by when said resiliently compressible seal is compressed to a maximum possible by said at least one securing means.

Preferably said at least one securing means includes at least one cam surface to engage said internal surface of said conduit.

Preferably said securing means includes a second cam surface and trailing portion the trailing portion to limit the rotation of said securing means.

Preferably said second cam surface and trailing portion are adapted to engage said hole in said conduit.

Preferably said securing means is brought into engagement with said internal surface of said conduit by means of movement in a direction perpendicular to the longitudinal axis of a conduit to which the fitting is to be attached, or parallel to a central axis perpendicular to said hole in a conduit with which the fitting is to be associated.

Preferably the conduit engaging end is shaped and sized so as to conform to an outside surface of one of the following: a square conduit; a rectangular conduit; a cylindrical conduit; an other shaped conduit; or tubular conduit.

Preferably if the conduit is of square or rectangular cross section the conduit engaging end is substantially in one plane.

Preferably the conduit engaging end includes means to hold a resiliently compressible seal.

Preferably said mounting surface and said conduit engaging end are located on opposite ends of the fitting to produce a substantially 180° passage therethrough or at an angle other than 180°.

Preferably the at least one sealing surface includes two surfaces at right angles to each other.

Preferably the at least one sealing surface includes two surfaces at right angles to a third surface to form a channel to hold said resiliently compressible seal for engagement with an external surface of said conduit.

Preferably any walls which include a sealing surface extending towards said conduit are of a height not greater than a thickness of said resiliently compressible member, when in a compressed state.

Preferably any walls which include a sealing surface limit the distance that said fitting can move towards said conduit as said resiliently compressible seal is compressed.

Preferably said resiliently compressible seal is selected from one of the 'O' ring type, the flat type or other resiliently compressible gasket.

Preferably at least one securing means is a single securing member adapted to engage said conduit near two diametrically opposite sides of said hole in said conduit.

Preferably said single securing member is bar shaped.

Preferably said single securing member is substantially U-shaped.

Preferably at two ends of said single securing member there is a shaped surface to engage an internal surface of said conduit.

Preferably said single securing member includes surfaces to engage the hole in said conduit which act to prevent said fitting, when it is secured, moving in said hole in a direction perpendicular to longitudinal axis of said securing member.

What is claimed is:

1. A fitting having at least one securing means to sealably secure said fitting to a hole in a conduit, said fitting having a conduit engaging end and a mounting surface at another end, said fitting being shaped to cooperate with an external surface of said conduit, said fitting including an aperture which communicates between said conduit engaging end and said mounting surface, said fitting including a resiliently compressible seal and at least one sealing surface surrounding said aperture in said conduit engaging end to make sealing contact said with said resiliently compressible seal when in use, said at least one securing means depending from said fitting to engage an internal surface of said conduit in the vicinity of said hole in said conduit, said at least one securing means when securing said fitting to said conduit thereby compressing said resiliently compressible seal between said at least one sealing surface and said external surface of said conduit and sealing, said fitting to said conduit, said at least one securing means including a shaped surface adapted to apply compressive deflection to said resiliently compressible seal when said at least one securing means is continued to be rotated after said shaped surface initially engages said internal surface of said conduit, said at least one securing means includes at least one cam surface to engage said internal surface of said conduit and a second cam surface and trailing portion, the trailing portion limiting the rotation of said securing means.

2. A fitting as claimed in claim 1, wherein said second cam surface and trailing portion are adapted to engage said conduit near said hole.

3. A fitting as claimed in claim 1, wherein the conduit engaging end includes means to hold a resiliently compressible seal.

4. A fitting as claimed in claim 1, wherein said at least one sealing surface is included in a groove or channel and the depth of said groove or channel is selected from one of the following: the depth is not greater than the thickness of said resiliently compressible seal, when in a compressed state; or the depth has a dimension less than a thickness of said resiliently compressible seal when in an uncompressed state.

5. A fitting as claimed in claim 1, wherein said at least one sealing surface limits the distance that said fitting can move towards said conduit as said resiliently compressible seal is compressed.

6. A fitting as claimed in claim 1, wherein said at least one securing means can be rotated into contact with said internal surface of said conduit and cannot be rotated past a predetermined point coinciding with said resiliently compressible seal being compressed to a maximum possible by said at least one securing means.

7. A fitting as claimed in claim 1, wherein said securing means is brought into engagement with said internal surface of said conduit by means of movement in a direction perpendicular to the longitudinal axis of a conduit to which the fitting is to be attached, or parallel to a central axis perpendicular to said hole in a conduit with which the fitting is to be associated.

8. A fitting as claimed in claim 1, wherein a centering means is provided which keeps said securing means located substantially equally spaced from the center of said hole in said conduit.

9. A fitting as claimed in claim 8, wherein when said fitting engages a cylindrical surface, the centering means is provided by said two securing means being diametrically opposed and positioned so as to engage said conduit near the circumference of said hole in said conduit approximately along an imaginary line parallel to the longitudinal axis of said conduit, running along said internal or external surface of said conduit, said imaginary line also being parallel to, collinear or coincident with a diameter of said hole, whereby said hole interacts with said securing means and said conduit engaging end of said fitting to prevent circumferential movement of said fitting relative to said conduit.

10. A fitting as claimed in any one of claims 1, wherein there are two securing means.

11. A fitting as claimed in claim 10, wherein the two securing means are diametrically opposed.

12. A fitting as claimed in claim 1, wherein said at least one securing means is a single securing member adapted to engage said conduit near to the hole near two diametrically opposite sides of said hole in said conduit.

13. A fitting as claimed in claim 1, wherein said securing means includes surfaces to engage the side wall of the hole in said conduit which acts to prevent said fitting, when it is secured moving in said hole in a direction perpendicular to a longitudinal axis of said securing member.

* * * * *